(12) United States Patent
Samson et al.

(10) Patent No.: US 9,229,138 B2
(45) Date of Patent: Jan. 5, 2016

(54) TWIN SUB-WAVELENGTH GRATING OPTICAL SIGNAL PROCESSOR

(75) Inventors: Scott Samson, Safety Harbor, FL (US);
Sunny Kedia, Palm Harbor, FL (US);
Al-Aakhir Rogers, Brandon, FL (US)

(73) Assignee: SRI INTERNATIONAL, Menlo Park, CA (US)

( * ) Notice: Subject to any disclaimer, the term of this patent is extended or adjusted under 35 U.S.C. 154(b) by 914 days.

(21) Appl. No.: 13/500,833

(22) PCT Filed: Oct. 5, 2010

(86) PCT No.: PCT/US2010/051438
§ 371 (c)(1),
(2), (4) Date: Apr. 6, 2012

(87) PCT Pub. No.: WO2011/081692
PCT Pub. Date: Jul. 7, 2011

(65) Prior Publication Data
US 2012/0198935 A1 Aug. 9, 2012

Related U.S. Application Data

(60) Provisional application No. 61/249,189, filed on Oct. 6, 2009.

(51) Int. Cl.
G01P 15/093 (2006.01)
G02B 5/18 (2006.01)
G02B 26/08 (2006.01)
G02B 26/10 (2006.01)
G02B 27/42 (2006.01)

(52) U.S. Cl.
CPC ............ *G02B 5/1809* (2013.01); *G01P 15/093* (2013.01); *G02B 26/0808* (2013.01); *G02B 26/106* (2013.01); *G02B 27/4277* (2013.01)

(58) Field of Classification Search
CPC ... G01P 15/093; G01P 15/18; G02B 26/0808; G02B 26/106; G02B 5/1828; G02B 5/1809
USPC .......... 73/514.26, 514.27, 653, 655; 356/491, 356/521, 519
See application file for complete search history.

(56) References Cited

U.S. PATENT DOCUMENTS

| | | | |
|---|---|---|---|
| 4,992,656 A * | 2/1991 | Clauser | 250/251 |
| 5,198,663 A * | 3/1993 | Ichikawa et al. | 250/231.1 |
| 5,335,548 A * | 8/1994 | Kalibjian | 73/655 |
| 5,515,730 A * | 5/1996 | Manzouri | 73/655 |
| 5,596,413 A | 1/1997 | Stanton et al. | |
| 5,654,540 A * | 8/1997 | Stanton et al. | 250/237 G |
| 6,473,187 B1 * | 10/2002 | Manalis | 356/521 |
| 6,567,174 B1 * | 5/2003 | Barker et al. | 356/491 |
| 6,628,392 B2 * | 9/2003 | Kuroda et al. | 356/400 |
| 7,091,715 B2 * | 8/2006 | Nemirovsky et al. | 73/514.26 |

(Continued)

OTHER PUBLICATIONS

PCT Search Report and Written Opinion for International Patent Application Serial No. PCT/US2010/051438, mailed Jul. 27, 2011, consists of 7 unnumbered pages.

*Primary Examiner* — Helen Kwok
(74) *Attorney, Agent, or Firm* — Marger Johnson (57) ABSTRACT

An optical signal processor includes a first sub-wavelength grating having a first grating period and a second sub-wavelength grating having a second grating period that is different than the first grating period of the first sub-wavelength grating.

18 Claims, 5 Drawing Sheets

(56) References Cited

U.S. PATENT DOCUMENTS

| | | | |
|---|---|---|---|
| 7,173,764 B2 * | 2/2007 | Carr et al. | 359/569 |
| 7,304,781 B2 * | 12/2007 | Chang-Hasnain et al. | 359/260 |
| 7,352,932 B1 * | 4/2008 | Chang et al. | 385/37 |
| 7,395,698 B2 * | 7/2008 | Degertekin | 73/105 |
| 8,205,497 B1 * | 6/2012 | Okandan et al. | 73/514.26 |
| 8,674,689 B1 * | 3/2014 | Nielson et al. | 324/244.1 |
| 8,726,730 B1 * | 5/2014 | Nielson et al. | 73/504.01 |
| 2002/0076154 A1 | 6/2002 | Maisenhoelder et al. | |
| 2002/0104381 A1 * | 8/2002 | Debesis et al. | 73/800 |
| 2003/0231396 A1 | 12/2003 | Nakai | |
| 2005/0061969 A1 | 3/2005 | Greywall | |
| 2006/0137467 A1 * | 6/2006 | Horowitz et al. | 73/815 |
| 2006/0181704 A1 * | 8/2006 | Cunningham et al. | 356/326 |
| 2007/0153860 A1 | 7/2007 | Chang-Hasnain et al. | |

* cited by examiner

TWIN SUB-WAVELENGTH GRATING OPTICAL SIGNAL PROCESSOR

CROSS REFERENCE TO RELATED APPLICATIONS

This application claims the benefit of U.S. Provisional Application No. 61/249,189, filed on Oct. 6, 2009, which is herein incorporated by reference in its entirety.

REFERENCE TO GOVERNMENT FUNDING

This application was made with Government support under contract no. W9113M-06-C-0022 awarded by the U.S. Army, and grant no. 0217675 awarded by the National Science Foundation. The Government has certain rights in this invention.

FIELD OF THE INVENTION

The present invention relates generally to the use of gratings for optical signal processing, and more specifically to the use of multiple sub-wavelength gratings for optical processing, such as in a micro-electromechanical system (MEMS) sensor or a laser beam scanner.

BACKGROUND OF THE INVENTION

Light can be used to obtain a read out of physical parameters. Some applications of this principle are used in resonant transmission of infra-red, terahertz (THz) radiation for communication or optical cavities or interferometers. However, present applications use metallic and dielectric gratings to leverage these optical effects.

Another option is to use gratings. Gratings are optical periodic elements with properties of dispersing and diffracting light. When the period of the grating is below the wavelength of normally incident light, diffraction orders are non-existent, but non-propagating evanescent waves exist parallel to the grating surface. However, these evanescent waves are not detectable by traditional optics because the energy decays exponentially to a negligible level within a micron from the grating surface. Thus, the use of a single grating presents challenges for using light to obtain read out of physical parameters.

SUMMARY OF THE INVENTION

In one embodiment, the present invention is directed towards an optical signal processor. In one embodiment, the optical signal processor comprises a first sub-wavelength grating having a first grating period and a second sub-wavelength grating having a second grating period that is different than the first grating period of the first sub-wavelength grating.

In one embodiment, the present invention is directed towards a micro-electromechanical structure (MEMS) based accelerometer. The MEMS based accelerometer comprises a light source, an optical signal processor for receiving light emitted from the light source and a means for detecting a change in a diffracted light intensity of the light emitted from the light source after passing through or reflecting from the optical signal processor. The optical signal processor comprises a first sub-wavelength grating having a first grating period and a second sub-wavelength grating having a second grating period that is different than the first grating period of the first sub-wavelength grating.

In one embodiment, the present invention is directed towards a laser beam scanner. The laser beam scanner comprises a light source, an optical signal processor for tuning light emitted from the light source and a beam block blocking a light component of the light source. The optical signal processor comprises a first sub-wavelength grating having a first grating period and a second sub-wavelength grating having a second grating period that is different than the first grating period of the first sub-wavelength grating.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure provides an optical signal processor, or alternatively referred to as an optical signal processing system, chip or sensor, that uses two sub-wavelength periodic gratings to generate and enhance transmission of evanescent waves. The two sub-wavelength periodic gratings are placed within close proximity to one another to generate an evanescent wave in a near-field region.

Typically, the evanescent waves are not detectable by traditional optics because the energy decays exponentially to a negligible level within a micron from the grating surface. However, by using two sub-wavelength periodic gratings, each having a different grating periods, the evanescent waves can be coupled and propagated into a far-field region.

The propagation and enhanced transmission of evanescent waves allows precise measurement of distances between surfaces. This principle can in turn be used to provide precise measurements in sensors such as an accelerometer, or other various types such as temperature sensors, pressure sensors, strain sensors, force sensors, gyroscopic sensors, acoustic sensors, ultrasonic sensors, vibration sensors, position feedback sensors such as for atomic force microscopy, or in a beam scanner.

Gratings are periodic structures that cause corresponding periodic amplitude or phase variations on an incident wave. The angular direction of plane waves after passing the grating is related to the grating's period by equation (1):

$$\sin(\alpha) = \lambda/\Lambda \tag{1}$$

where $\alpha$ is an angle between a diffracted wave and an incident one, $\lambda$ is a wavelength of incident radiation and $\Lambda$ is a grating period. The wavenumber of the propagating light can be written as shown by equation (2):

$$k_z = \sqrt{((2\pi/\lambda)^2 - (2\pi/\Lambda)^2)}, \tag{2}$$

where real solutions for $k_z$ denote propagating waves and imaginary solutions, where the grating is sub-wavelength (i.e., $\Lambda < \lambda$) that denote exponentially-decaying evanescent waves.

The diffraction of waves from a grating may be represented in space and angular frequency domains. A similar derivation for a pair of closely-spaced gratings can be performed. Using an input light angular spectrum and each grating having a different frequency ($f_{x1}$ and $f_{x2}$) frequency components at ($f_{x1}+f_{x2}$), ($f_{x1}-f_{x2}$), ($-f_{x1}+f_{x2}$) and ($-f_{x1}-f_{x2}$) are produced. Viewed in a spatial frequency domain, the gratings are seen to have an angular-conversion effect on the incident waves as shown by equation (3):

$$\alpha = \pm \sin^{-1}(\lambda * [1/\Lambda_1 - 1/\Lambda_2]), \quad (3)$$

wherein $\Lambda_1$ represents a first grating period and $\Lambda_2$ represents a second grating period.

The effective grating period ($\Lambda_{eff}$), or the period that the coupled grating appears to have when in proximity to each other is defined by equation (4):

$$1/\Lambda_{eff} = 1/\Lambda_1 - 1/\Lambda_2 \quad (4)$$

Moreover, even if the grating periods are each sub-wavelength, real propagating diffraction angles can be produced by a pair of such gratings. If the grating periods are distinct, the diffracted light is spatially separated from the incident light.

Figure 1:
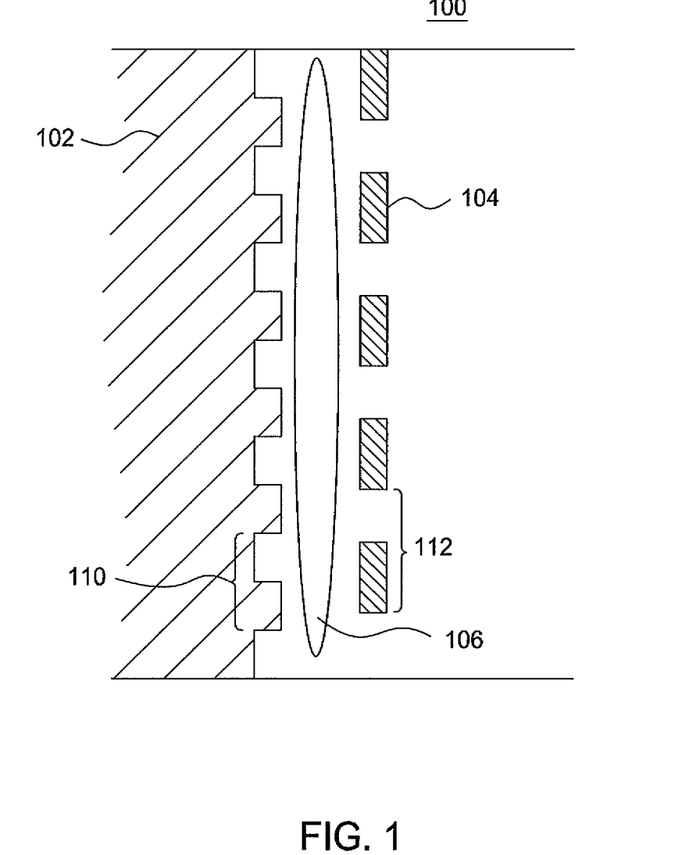
FIG. 1 illustrates a cross sectional block diagram of one embodiment of a optical signal processor.

FIG. 1 illustrates a cross sectional block diagram of one embodiment of a optical signal processor 100 having two periodic gratings that take advantage of the mathematical principles discussed above. A first periodic grating 102 comprises a transparent substrate. For example, the first periodic grating 102 may be fabricated from a material such as glass, silicon or plastic. The first periodic grating 102 has a first period 110. The first periodic grating 102 may have a thickness, width and cross-sectional profile that is optimized to maximize evanescent wave coupling.

A second periodic grating 104 comprises a substrate that may be either transparent or reflective depending on the application of the optical signal processor 100. However, for the purposes of examples described herein, the second periodic grating 104 is also transparent. The second periodic grating 104 may be fabricated from a material such as glass, silicon or plastic. The second periodic grating 104 has a second period 112. The second periodic grating 104 may have a thickness, width and cross-sectional profile that is optimized to maximize evanescent wave coupling.

It should be noted that the first periodic grating 102 and the second periodic grating 104 are different. That is, the spacing of the gratings of the first periodic grating 102 and the spacing of the gratings of the second periodic grating 104 are not the same.

In one embodiment, the first periodic grating 102 and the second periodic grating 104 are sub-wavelength. That is, the spacing of the gratings of the first periodic grating 102 and the second periodic grating 104 are less than a period of an illuminating radiation or a light source. The light sources comprises a wavelength in an ultraviolet region, a visible region, an infrared region, a terahertz radiation region or a microwave region of a light spectrum.

The actual value of the spacing of the gratings of the first periodic grating 102 and the second periodic grating 104 may vary and may be optimized depending on the illuminating radiation and a particular application. In one embodiment, the first periodic grating 102 and the second periodic grating 104 may be produced on a substrate by etching using traditional photolithography techniques, electron-beam patterning techniques, projection patterning techniques, holographic patterning techniques, nano-patterning techniques or embossing techniques.

The optical signal processor 100 also includes a separation or a gap 106. The size of the separation 106 may vary and be optimized depending on the illuminating radiation and a particular application. The separation 106 is an evanescent wave coupling region.

The optical signal processor 100 of the above design overcomes the problem of the exponential decrease of evanescent waves resulting from a single grating. As a result, using two sub-wavelength gratings, as described above, couples the evanescent waves in the separation 106 to propagate the evanescent waves into the far field such that the evanescent waves may be utilized for various applications. One example of an optical signal processor 100 of the present disclosure is provided below with examples of how optimization was performed.

Example 1

In one example, a first sub-wavelength grating having a grating period $\Lambda_1$=1.0 microns (μm) in a borosilicate glass substrate was used. A second sub-wavelength grating having a grating period $\Lambda_2$=1.1 μm in a silicon substrate was used. A gaussian incident source of $\lambda$=1.550 μm was used.

The gap separation between the first sub-wavelength grating and the second sub-wavelength grating were kept constant at 0.3 μm while the grating thickness was varied from 0.1 μm to 0.6 μm on an individual coupled glass pair and a coupled silicon pair. The optimum grating thickness for gratings in glass and silicon were found to be approximately 300 nanometers (nm) and 140 nm, respectively.

Having obtained the optimum grating thickness, the grating in the glass and the silicon were coupled together where the gap separation was varied from 0 nm to 600 nm in 100 nm increments. It was found that the closer the first sub-wavelength grating and the second sub-wavelength grating are together, the greater the output intensity of the coupled sub-wavelength gratings. It was determined that an optimal gap separation was approximately 100 nm for an expected 100 nm maximum displacement amplitude. The optical sensor having such optimal parameters yielded an effective grating period $\Lambda_{eff}$=11.0 μm, which is no longer sub-wavelength to the 1.550 μm input.

In another example, an effective grating period $\Lambda_{eff}$=2.93 μm was achieved using a first periodic grating having a grating period $\Lambda_1$=0.8 μm and a second periodic grating having a grating period $\Lambda_2$=1.1 μm on 600 nm thick gratings for infrared light. In yet another example, an effective grating period $\Lambda_{eff}$=2.0 μm was achieved using a first periodic grating having a grating period $\Lambda_1$=0.4 μm and a second periodic grating having a grating period $\Lambda_2$=0.5 μm on 200 nm thick gratings for visible light.

It should be noted that the above example should not be limiting and is only provided as a specific example including the specific materials discussed above. In other words, the various dimensions and parameters of the optical signal processor 100 may vary depending a particular application or materials that are used. The above example is provided to illustrate how parameters may be "optimized" to alter dynamic range or diffraction angle of the coupled light. Thus, although approximate numbers are provided in the example, it should be noted that any range of values may be used depending on the particular application, materials or illuminating wavelength that are used and the "optimal" values that result.

The optical signal processor 100 described above can be used in various applications for sensing acceleration per change in the separation 106. This small proximity change in the separation 106 of the evanescent wave coupling output intensity makes this new coupling design ideal for sub-nanometer displacement detection.

Figure 2:
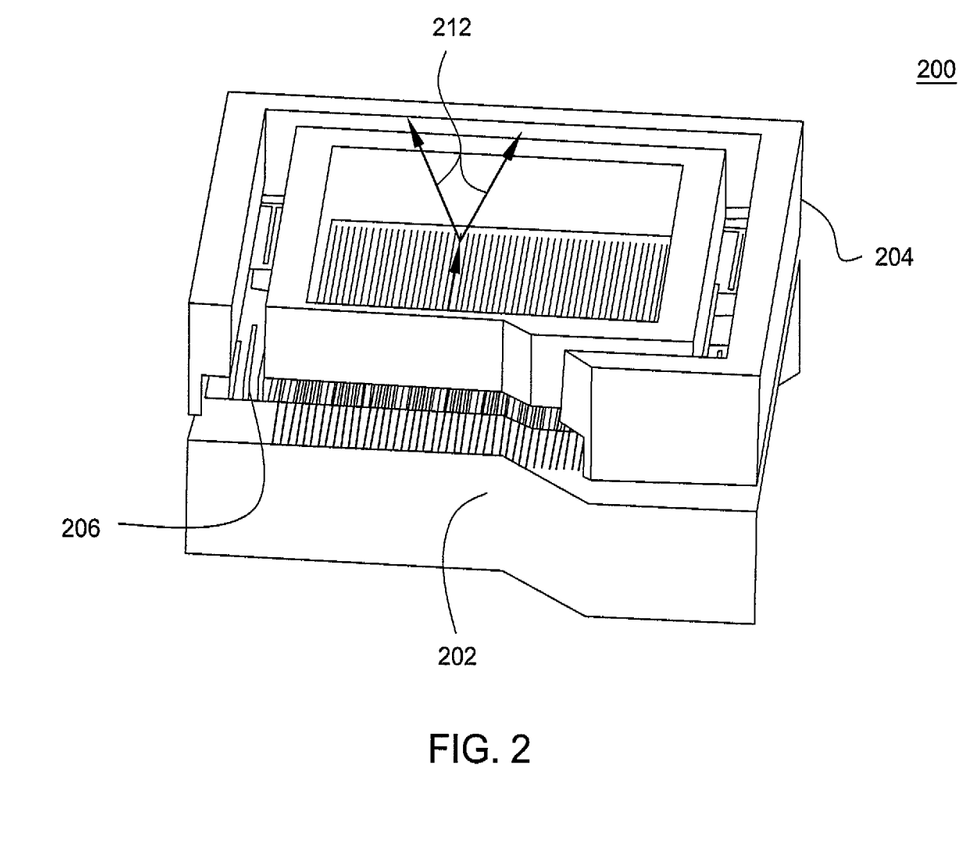
FIG. 2 illustrates an isometric view of one embodiment of an optical signal processor for an accelerometer.

One particular application of the optical signal processor 100 may be for use in a micro-electromechanical system (MEMS) based sensor 200 illustrated in FIG. 2. The MEMS based sensor using the optical signal processor 100 of the present disclosure can provide highly accurate measurements for temperature, pressure or any other desired sensing applications.

The MEMS based sensor 200 may include a first periodic grating 202 on a glass chip with periodic gratings etched into the glass with a gold bond frame. The MEMS based sensor 200 also includes a second periodic grating 204 on a silicon chip with periodic gratings etched into the silicon with a gold bond frame. A suspended spring/membrane structure 206 is provided between the first periodic grating 202 and the second periodic grating 204. The first periodic grating 202 is fixed and the second periodic grating 204 is moveable via the suspended spring/membrane structure 206. The separation is provided by a total thickness of the gold bond frames. Although, the present example uses gold-gold thermocompression bonding, it should be noted that other bonding methods could be used such as, for example, anodic bonding, adhesive bonding, solder, and the like. The arrows 212 illustrate a diffracted light intensity proportional to inter-grating spacing.

Figure 3:
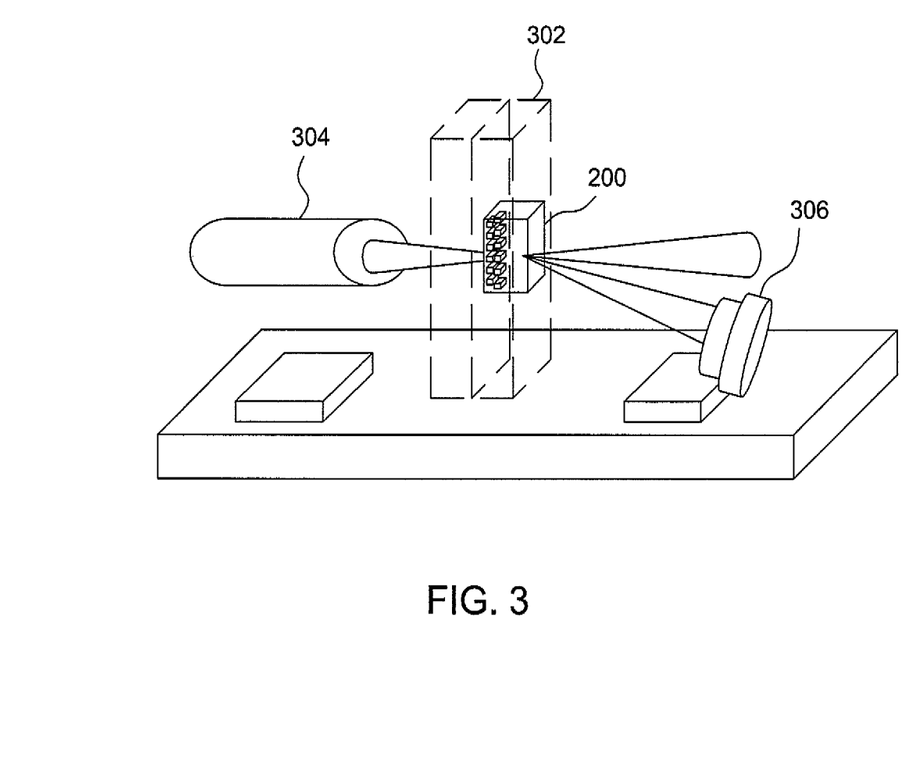
FIG. 3 illustrates a block diagram of one embodiment of a system using the accelerometer.

FIG. 3 illustrates an accelerometer 300 using the MEMS based sensor 200 illustrated in FIG. 2. Acceleration may be in either direction (e.g. left or right). In one embodiment, the MEMS based sensor 200 may be placed on a wafer 302. The wafer 302 may be a silicon wafer, a glass wafer or a plastic wafer. In one embodiment, the wafer 302 may be approximately 3.00 µm to 5.00 µm thick.

The accelerometer 300 includes an incident light source 304. In one embodiment, the incident light source 304 may be a laser (e.g., an infrared laser or a helium neon laser). The accelerometer also includes a means for detecting 306 a change in the gap-dependent diffracted light intensity. In one embodiment, the means for detecting 306 may be a photodiode receiver.

Changes in the separation 106 of the optical signal processor 100 caused by acceleration normal to a surface of the MEMS based sensor 200 induce a change in the gap-dependent diffracted light intensity. The means for detecting 306, e.g. a photodiode, and readout circuitry (not shown) is used to monitor this diffracted light passing through or reflected from the optical signal processor 100, from which the gap and acceleration can be determined.

Figure 4:
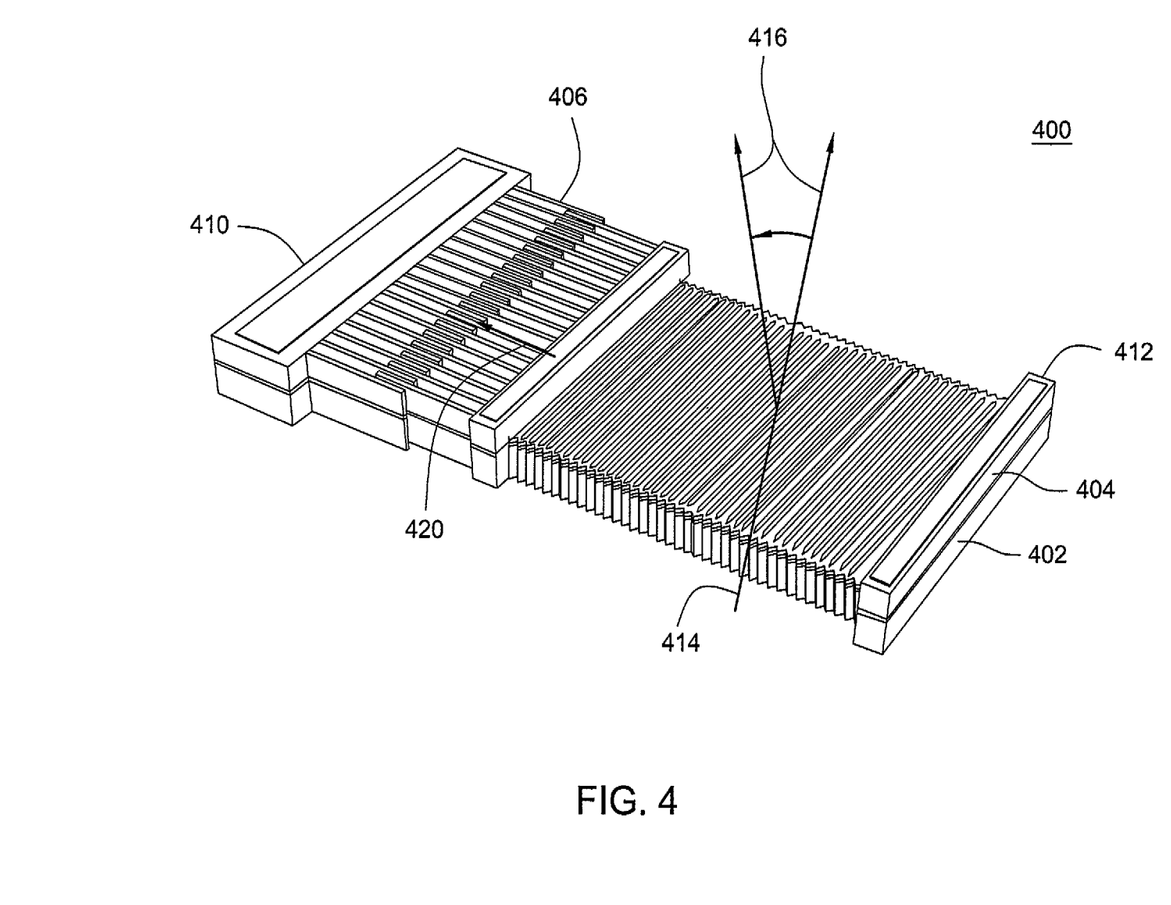
FIG. 4 illustrates an isometric view of one embodiment of an optical signal processor for a beam scanner chip.

Another particular application of the optical signal processor 100 may be for use in a beam scanner chip 400 as illustrated in FIG. 4. The beam scanner chip includes a first periodic grating 402 and a second periodic grating 404. Both the first periodic grating 402 and the second periodic grating 404 are anchored or fixed at ends 410 and 412.

The second periodic grating 404 may be stretched by one or more MEMS mechanical actuators 406. For example, a voltage may be applied to the MEMS mechanical actuators 406 to stretch the second periodic grating 404 to tune a diffracted angle of light. The stretching may be either thermal, electrostatic or by other electromechanical methods such as magnetic.

Various styles of springs may be used to stretch the second periodic grating 404. In one embodiment, an inverted "V" shape, where the two ends of the "V" connect the gratings may be used. The spring should be thin and long and flexible. Increasing a length of the spring (e.g., the MEMS actuators 406) reduces the force required to elongate the spring. In an alternate embodiment, a viscoelastic material could be used to act as both the second periodic grating 404 and spring elements.

For example, an input light source 414 may be passed through the beam scanner chip 400. The input light source 414 may be diffracted at a particular angle as illustrated by arrows 416. By stretching the second periodic grating 404, the diffracted angle may be tuned according to equation (3) provided above.

Figure 5:
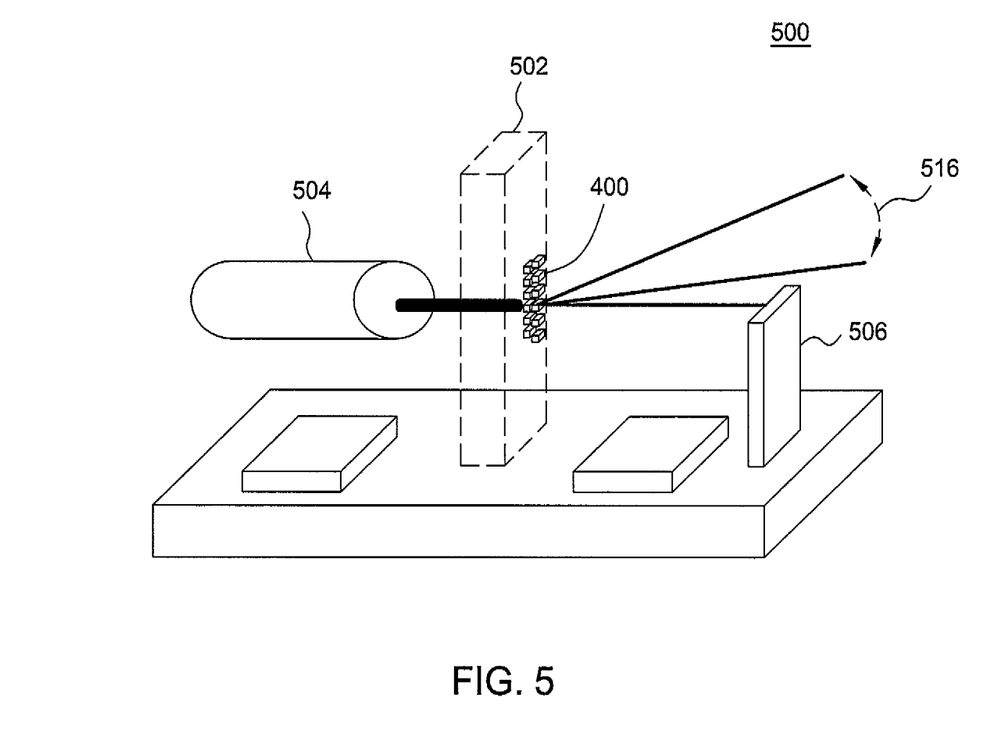
FIG. 5 illustrates a block diagram of one embodiment of a system using the beam scanner chip.

FIG. 5 illustrates a beam scanner system 500 using the beam scanner chip 400. The beam scanner system 500 includes the beam scanner chip 400 on a wafer 502. The wafer 502 may be a silicon wafer, a glass wafer or a plastic wafer. In one embodiment, the wafer 502 may be approximately 3.00 µm to 5.00 µm thick.

The beam scanner system 500 includes an incident light source 504. In one embodiment, the incident light source 504 may be a laser (e.g., an infrared laser or a helium neon laser). As discussed above, a voltage may be applied to the beam scanner chip 400 to stretch the second periodic grating 404 to tune an angle 516 of the diffracted light of the incident light source 504.

The beam scanner system 500 also includes a beam block 506. A portion of the input light source passes straight through the beam scanner chip 400 known as a $0^{th}$ order light component. The beam block 506 blocks the $0^{th}$ order light component in the beam scanner system 500.

The beam scanner system 500 may be useful for various applications. For example, the beam scanner system 500 may be used for various applications such as target tracking, laser deflection, UPC barcode readers, information projectors, and a variety of other military and commercial applications. Prior systems make use of rotating mirrors, mechanical galvanometers or acousto-optic deflectors, each of which has high power consumption, are mechanically slow and/or have fixed output patterns. The beam scanner system 500 of the present disclosure overcomes the disadvantages associated with these prior systems.

While various embodiments have been described above, it should be understood that they have been presented by way of example only, and should not be considered limiting. Thus, the breadth and scope of a preferred embodiment should not be limited by any of the above-described exemplary embodiments, but should be defined only in accordance with the following claims and their equivalents.

What is claimed is:

1. An optical signal processor comprising:
a first sub-wavelength grating having a first grating period; and
a second sub-wavelength grating having a second grating period that is different than the first grating period of the first sub-wavelength grating,
wherein the first grating period and the second grating period are less than a wavelength of a light source, and
wherein at least one of the first sub-wavelength grating or the second sub-wavelength grating is transparent to the light source.

2. The optical signal processor of claim 1, wherein the wavelength of the light source comprises a wavelength in a region of a light spectrum of at least one of: an ultraviolet region, a visible region, an infrared region, a terahertz radiation region or a microwave region.

3. The optical signal processor of claim 1, further comprising:
   a gap between the first sub-wavelength grating and the second sub-wavelength grating.

4. The optical signal processor of claim 3, wherein the gap is approximately 0.1 micron (μm) to 0.6 μm.

5. The optical signal processor of claim 1, wherein the first sub-wavelength grating comprises at least one of: glass, silicon or plastic and the second sub-wavelength gratin comprises at least one of class, silicon or plastic.

6. The optical signal processor of claim 1, wherein at least the first sub-wavelength grating or the second sub-wavelength grating is on a moveable structure.

7. The optical signal processor of claim 6, wherein one of the first sub-wavelength grating or the second sub-wavelength grating is on a fixed structure.

8. The optical signal processor of claim 6, wherein the moveable structure comprises a moveable micro-electromechanical structures (MEMS).

9. The optical signal processor of claim 1, wherein the optical signal processor is a part of a micro-electromechanical structure (MEMS) accelerometer based sensor comprising at least one of: a pressure sensor, a temperature sensor, a strain sensor, a force sensor, a gyroscopic sensor, an acoustic sensor, an ultrasonic sensor, a vibration sensor or a position feedback sensor.

10. The optical signal processor of claim 1, wherein the optical signal processor is part of a beam scanner.

11. A micro-electromechanical structure (MEMS) accelerometer comprising:
   a light source;
   an optical signal processor for receiving light emitted from the light source, the optical signal processor comprising:
   a first sub-wavelength grating having a first grating period; and
   a second sub-wavelength grating having a second grating period that is different than the first grating period of the first sub-wavelength grating; and
   a means for detecting a change in a diffracted light intensity of the light emitted from the light source after passing through the optical signal processor.

12. The MEMS accelerometer of claim 11, wherein the first grating period and the second grating period are less than a wavelength of the light source.

13. The MEMS accelerometer of claim 11, further comprising:
   a gap between the first sub-wavelength grating and the second sub-wavelength grating.

14. The MEMS accelerometer of claim 11, wherein the first sub-wavelength grating comprises at least one of: glass, silicon or plastic and the second sub-wavelength grating comprises at least one of: glass, silicon or plastic.

15. The MEMS accelerometer of claim 11, wherein at least the first sub-wavelength grating or the second sub-wavelength grating is on a moveable structure.

16. The MEMS accelerometer of claim 15, wherein one of the first sub-wavelength grating or the second sub-wavelength grating is on a fixed structure.

17. A laser beam scanner comprising:
   a light source;
   an optical signal processor for tuning light emitted from the light source, the optical signal processor comprising:
   a first sub-wavelength grating having a first grating period; and
   a second sub-wavelength grating having a second grating period that is different than the first grating period of the first sub-wavelength grating, wherein the first grating period and the second grating periods are less than the wavelength of the light source and at least one of the first and second sub-wavelength gratings are transparent to the light source; and
   a beam block blocking a light component of the light source.

18. The laser beam scanner of claim 17, further comprising:
   a micro-electromechanical structure (MEMS) actuator to stretch the second sub-wavelength grating to tune the light emitted from the light source.

* * * * *